US 9,503,675 B2

United States Patent
Choi

(10) Patent No.: US 9,503,675 B2
(45) Date of Patent: Nov. 22, 2016

(54) MOBILE TERMINAL AND CONTROL METHOD THEREOF

(71) Applicant: LG ELECTRONICS INC., Seoul (KR)

(72) Inventor: Hyeongseok Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 14/198,420

(22) Filed: Mar. 5, 2014

(65) Prior Publication Data

US 2015/0093094 A1    Apr. 2, 2015

(30) Foreign Application Priority Data

Oct. 2, 2013 (KR) ........................ 10-2013-0118079

(51) Int. Cl.

| | |
|---|---|
| *H04N 9/80* | (2006.01) |
| *H04N 5/92* | (2006.01) |
| *H04N 9/82* | (2006.01) |
| *H04N 5/77* | (2006.01) |
| *G11B 27/10* | (2006.01) |
| *G11B 27/34* | (2006.01) |
| *G11B 27/034* | (2006.01) |
| *H04N 5/93* | (2006.01) |
| *G11B 27/00* | (2006.01) |
| *H04N 5/232* | (2006.01) |

(52) U.S. Cl.
CPC ............. *H04N 5/772* (2013.01); *G11B 27/034* (2013.01); *G11B 27/10* (2013.01); *G11B 27/34* (2013.01); *H04N 9/8211* (2013.01); *H04N 5/23293* (2013.01)

(58) Field of Classification Search
USPC ....... 386/239, 241, 245, 248, 278, 280, 282, 386/326, 353
See application file for complete search history.

(56) References Cited

U.S. PATENT DOCUMENTS

| 8,693,842 | B2 * | 4/2014 | Srinivas et al. ............... 386/240 |
| 2003/0190142 | A1 * | 10/2003 | Togashi ................ G06F 1/1626 386/235 |
| 2008/0147841 | A1 * | 6/2008 | Nishino et al. ................ 709/223 |
| 2011/0135283 | A1 * | 6/2011 | Poniatowki et al. .......... 386/297 |

* cited by examiner

*Primary Examiner* — Daquan Zhao
(74) *Attorney, Agent, or Firm* — Lee, Hong, Degerman, Kang & Waimey

(57) ABSTRACT

The present disclosure relates to a mobile terminal and a control method thereof. A mobile terminal on which a video capturing function is executed according to one exemplary embodiment includes a camera that is configured to capture the video, a display unit that is configured to output a video frame received from the camera, and a controller that is configured to store time point information related to a time point at which a control command for inputting memo information during capturing of the video is received when the control command is received, and process the memo information, set after completion of the capturing of the video, in such a manner of associating the memo information with at least one video frame corresponding to the time point information within the captured video.

21 Claims, 11 Drawing Sheets

FIG. 6
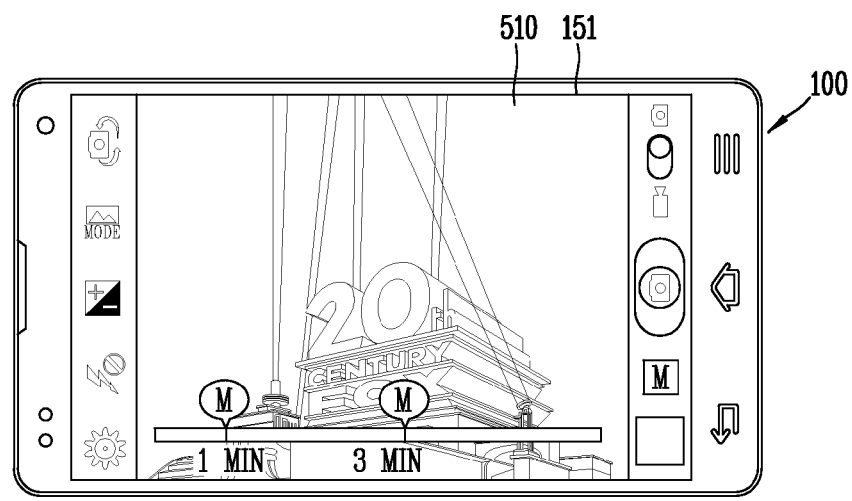
(a)
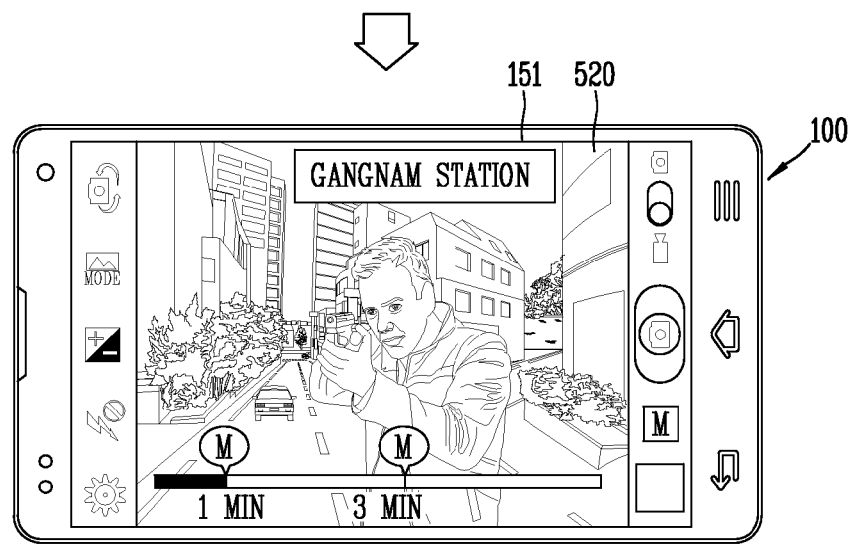
(b)

FIG. 9
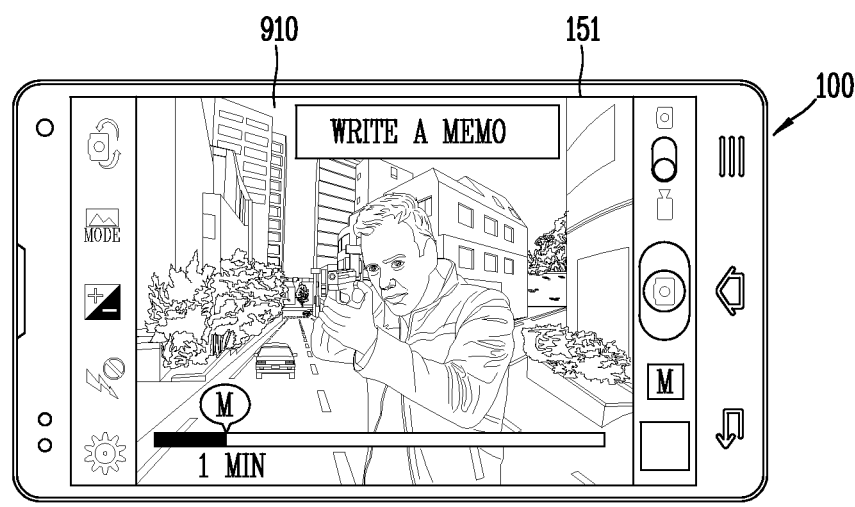
(a)
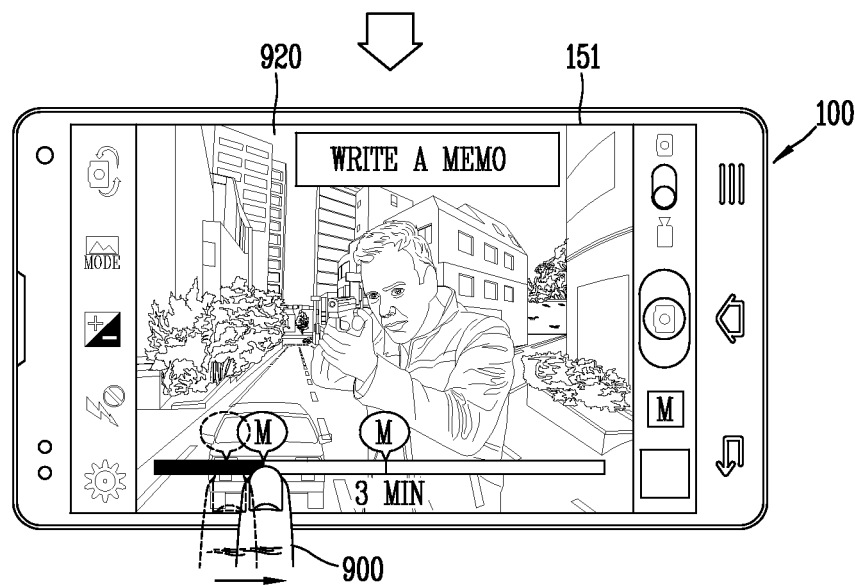
(b)

FIG. 10
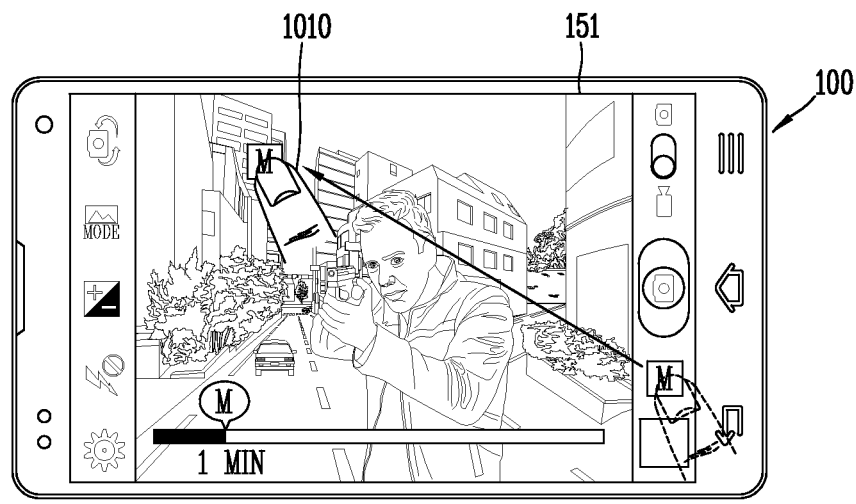
(a)
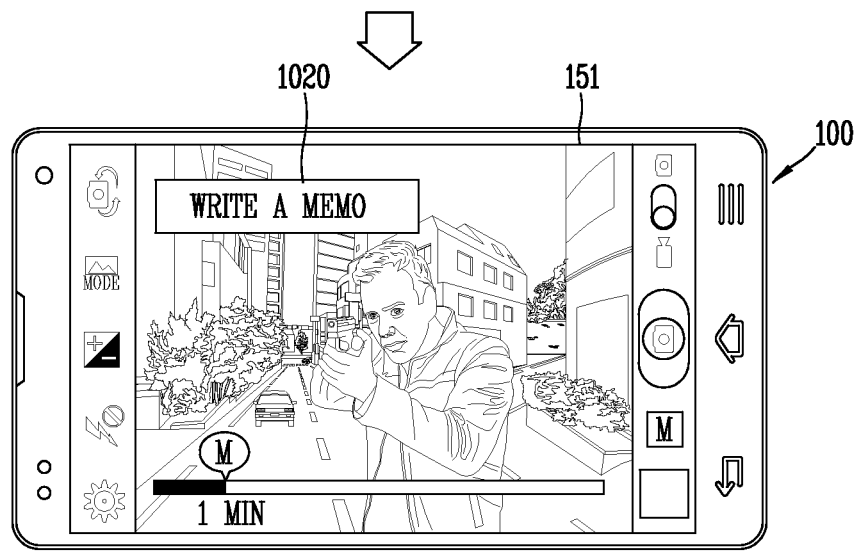
(b)

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0118079, filed on Oct. 2, 2013, the contents of which is incorporated by reference herein in its entirety.

BACKGROUND OF THE DISCLOSURE

1. Field of the Disclosure

This specification relates to a mobile terminal capable of capturing a video (or a moving image) and a control method thereof.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements. As one example, a user interface environment for allowing a user to search for or select functions easily and conveniently is provided.

With improvement of technologies relating to cameras installed in mobile terminals, various functions using portable cameras are under development. A user who captures a video using the camera may have a need to input a memo during the capturing. Methods of inputting memos after completely capturing a video have already been developed, but a method of inputting a memo while capturing a video has not been developed yet.

SUMMARY OF THE DISCLOSURE

Therefore, an aspect of the detailed description is to provide a method of inputting information while capturing a video.

To achieve these and other advantages and in accordance with the purpose of this specification, as embodied and broadly described herein, there is provided a mobile terminal, including a camera that is configured to capture the video, a display unit that is configured to output an image received from the camera, and a controller that is configured to store time point information related to a control command-received time point when the control command for inputting memo information is received while capturing the video, and process the memo information, set after completion of the capturing of the video, in such a manner of associating the memo information with at least one image corresponding to the time point information within the captured video.

In accordance with one exemplary embodiment disclosed herein, the controller may output the set memo information along with the at least one image corresponding to the time point information when the captured video is reproduced.

In accordance with one exemplary embodiment disclosed herein, the controller may keep outputting the memo information for a specific reproduction section which includes the time point when the captured video is reproduced.

In accordance with one exemplary embodiment disclosed herein, a length of the specific reproduction section for which the input memo information is continuously output may be decided by a user selection or corresponds to a preset value.

In accordance with one exemplary embodiment disclosed herein, a progress bar indicating a progress of the capturing of the video may be output on one area of the display unit, and the controller may output at least one graphic object, which matches the time point information, on an area adjacent to the area with the progress bar output.

In accordance with one exemplary embodiment disclosed herein, the at least one graphic object may be output on a position, corresponding to the time point information matched with the graphic object, of progressing positions of the progress bar.

In accordance with one exemplary embodiment disclosed herein, the controller may change the control command-received time point by a user selection, and the memo information may be output on an image related to the changed time point, different from the at least one image corresponding to the time point information prior to the change, when the control command-received time point is changed.

In accordance with one exemplary embodiment disclosed herein, a progress bar indicating a progress of a reproducing of the video after completion of the capturing of the video and a graphic object matched with the time point information may be output on one area of the display unit, and the change in the control command-received time point may be executed by movement of the graphic object In accordance with one exemplary embodiment disclosed herein, the at least one image output along with the memo information may be changed based on movement of the graphic object.

In accordance with one exemplary embodiment disclosed herein, time point information corresponding to the moved graphic object may be a time point corresponding to a position of the progress bar to which the graphic object has been moved.

In accordance with one exemplary embodiment disclosed herein, the controller may reproduce a specific reproduction section of the video including a time point corresponding to one selected graphic object within the captured video when the one graphic object is selected from the at least one graphic object after completion of the capturing of the video.

In accordance with one exemplary embodiment disclosed herein, an image for outputting the set memo thereon may be decided when one time point included in the specific reproduction section is selected, while the specific reproduction section of the video is reproduced through the selection of the graphic object.

In accordance with one exemplary embodiment disclosed herein, whether or not to output the set memo information may be decided based on a user's touch input with respect to the graphic object.

In accordance with one exemplary embodiment disclosed herein, the controller may no longer output the memo information which is output at the time point corresponding to the graphic object, when the graphic object disappears from the display unit in response to the user's touch manipulation.

In accordance with one exemplary embodiment disclosed herein, an appearance of the graphic object may be decided based on at least one of the time point at which the memo information is to be input and a type of the memo information.

In accordance with one exemplary embodiment disclosed herein, the memo information may be at least an image, text or voice.

In accordance with one exemplary embodiment disclosed herein, a graphic object for setting a position on which the memo information is to be output may be output on the display unit after completion of the capturing of the video, and the position on which the memo information is to be output may be decided based on a position of the graphic object.

In accordance with one exemplary embodiment disclosed herein, the position of the graphic object may be decided in response to a user's touch input.

To achieve these and other advantages and in accordance with the purpose of this specification, as embodied and broadly described herein, there is provided a control method for a mobile terminal, the method including capturing a video, storing time point information corresponding to a control command-received time point when the control command for inputting memo information is received while capturing the video, and processing the memo information after completion of the capturing of the video, in such a manner of associating the memo information with at least one image corresponding to the time point information within the captured video.

In accordance with one exemplary embodiment disclosed herein, the memo information may be output along with the at least one image corresponding to the time point information while the video is reproduced.

In accordance with one exemplary embodiment disclosed herein, the time point information may include specific reproduction section information including the control command-received time point, and the memo information may be continuously output for the specific reproduction section while the video is reproduced.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 6 is a conceptual view of outputting the memo information while a video is played back (or reproduced) in the mobile terminal;

FIG. 9 is a conceptual view of changing an image on which the memo information is to be output in the mobile terminal;

FIG. 10 is a conceptual view of setting a position to output the memo information in the mobile terminal.

DETAILED DESCRIPTION OF THE DISCLOSURE

Hereinafter, a mobile terminal associated with the present disclosure will be described in more detail with reference to the accompanying drawings. Hereinafter, suffixes "module" and "unit or portion" for components used herein in description are merely provided only for facilitation of preparing this specification, and thus they are not granted a specific meaning or function.

A mobile terminal disclosed herein may include a laptop computer, a tablet PC, a mobile phone, a smart phone, a digital broadcast terminal, a personal digital assistant (PDA), a portable multimedia player (PMP), a navigator, and the like.

Figure 1:
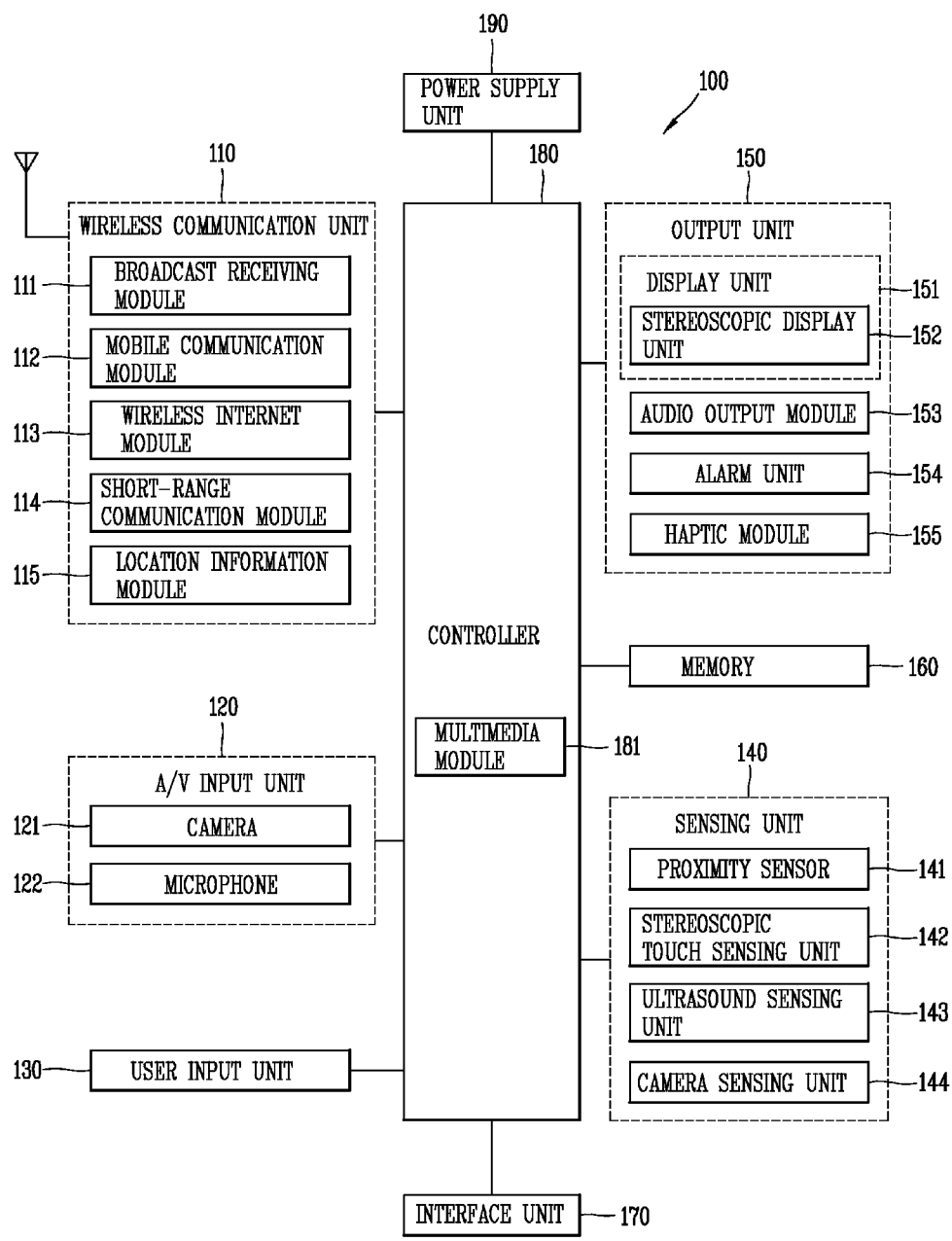
FIG. 1 is a block diagram of a mobile terminal in accordance with one exemplary embodiment.

FIG. 1 is a block diagram of a mobile terminal in accordance with one exemplary embodiment.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

Hereinafter, the constituent elements will be described in turn.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

Broadcast signals and/or broadcast associated information received via the broadcast receiving module 111 may be stored in a suitable device, such as a memory 160.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module.

Referring to FIG. 1, the A/V input unit 120 receives an audio or video signal, and the A/V input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, existence or non-existence of a user contact, an orientation of the mobile terminal 100 and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 153, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some of those displays may be configured with a transparent or optical transparent type to allow viewing of the exterior through the display unit, and such displays may be called transparent displays. An example of a typical transparent display may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

In embodiments where the display unit 151 and a touch sensitive sensor (referred to as 'touch sensor') have an interlayer structure, the structure may be referred to as a 'touch screen'. The display unit 151 may be used as an input device in addition to being used as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor may sense a presence or absence of an object approaching a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch," whereas a status that the pointer substantially comes in contact with the touch screen will be referred to as "contact touch." For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The terminal may include a light sensor, a gyro sensor and the like as well as the proximity sensor. The light sensor may measure an amount of ambient light. The gyro sensor is also called an acceleration sensor which may measure velocity and location of a moving terminal.

The audio output module 153 may output audio data received from the wireless communication unit 110 or stored in the memory 160 in a call-receiving mode, a call-placing mode, a recording mode, voice recognition mode, a broadcast reception mode, and the like. The audio output module 153 may output audio signals relating to functions performed in the mobile terminal 100, e.g., sound alarming a call received or a message received, and so on. The audio output module 153 may include a receiver, a speaker, a buzzer, and so on.

The alarm unit 154 outputs signals notifying occurrence of events from the mobile terminal 100. The events occurring from the mobile terminal 100 may include a call received, a message received, a key signal input, a touch input, and the like. The alarm unit 154 may output not only video or audio signals, but also other types of signals such as signals notifying occurrence of events in a vibration manner. Since the video or audio signals can be output through the display unit 151 or the audio output unit 152, the display unit 151 and the audio output module 153 may be categorized into a part of the alarm unit 154.

The haptic module 155 generates various tactile effects which a user can feel. A representative example of the tactile effects generated by the haptic module 155 includes vibration. Vibration generated by the haptic module 155 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects (signals) through a user's direct contact, or a user's muscular sense using a finger or a hand. The haptic module 155 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, description will be given of the structure of the mobile terminal illustrated in FIG. 1.

Figure 2A:
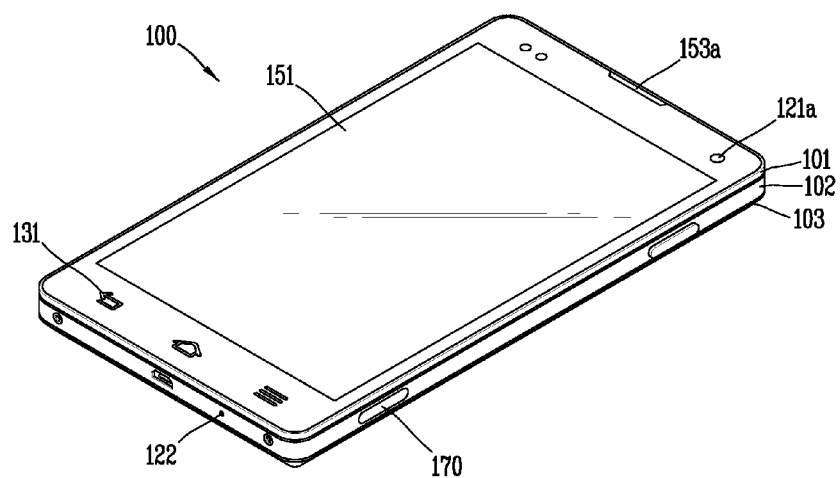
FIG. 2A is a front perspective view of one example of the mobile terminal in accordance with the one exemplary embodiment.
Figure 2B:
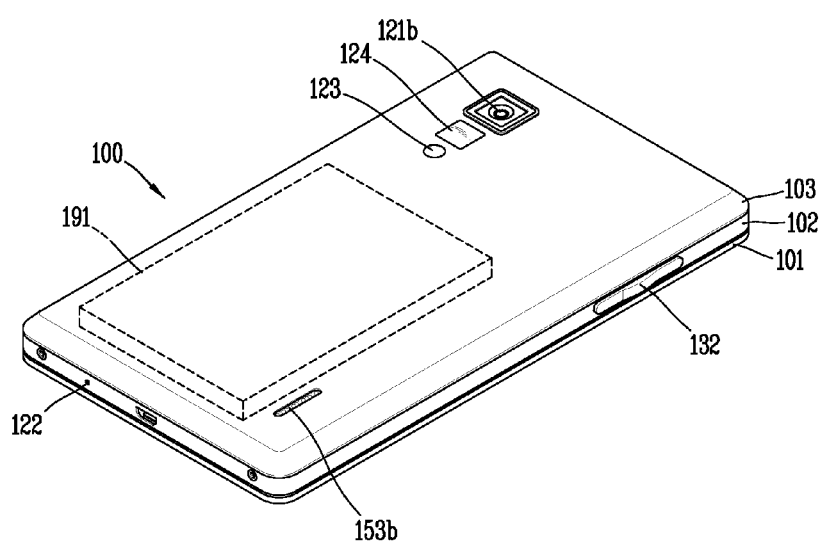
FIG. 2B is a rear perspective view of the mobile terminal illustrated in FIG. 2A.

FIG. 2A is a front perspective view of one example of the mobile terminal in accordance with the one exemplary embodiment, and FIG. 2B is a rear perspective view of the mobile terminal illustrated in FIG. 2A.

The mobile terminal 100 disclosed herein may be provided with a bar-type terminal body. However, the present disclosure may not be limited to this, but also may be applicable to various structures such as slide type, folder type, swing type, swivel type, or the like, in which two and more bodies are combined with each other in a relatively movable manner.

A main body (hereinafter, referred to as a body) of the mobile terminal 100 may include a front surface, side surfaces and a rear surface. Also, the body may include both ends formed along a lengthwise direction thereof.

The body may include a case (casing, housing, cover, etc.) forming the appearance of the terminal. In this embodiment, the case may be divided into a front surface (hereinafter, referred to as a front case 101) and a rear surface (referred to as a rear case 102). Various electronic components may be incorporated into a space formed between the front case 101 and the rear case 102. At least one middle case may be additionally disposed between the front case 101 and the rear case 102.

The cases may be formed by injection-molding synthetic resin or may be formed of a metal, for example, stainless steel (STS), titanium (Ti), or the like.

A display unit 151, an audio output module 153, a camera 121, a user input unit 130/131,132, a microphone 122, an interface unit 170, and the like may be disposed on the front case 101 of the terminal body.

The display unit 151 may occupy most of a principal surface of the front case 101. The audio output module 153 and the camera 121 may be disposed near one of both end portions of the display unit 151, and the user input unit 131 and the microphone 122 on the other end portion of the display unit 151. The user input unit 131, the interface unit 170 and the like may be disposed on side surfaces of the front and rear cases 101 and 102. The microphone 122 may be disposed on the other end of the body 100.

The user input unit 130 may be manipulated to allow inputting of commands for controlling operations of the electronic device 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 153, conversion of the display unit 151 into a touch recognition mode, or the like.

Referring to FIG. 2B, an audio output module 153b may further be disposed at a rear face of the terminal body, namely, the rear case 102. The audio output module 153b can cooperate with the audio output module 153 (see FIG. 2A) to provide stereo output. Also, the audio output module 153b may be configured to operate as a speakerphone.

The rear case 102 of the terminal body may further be provided with a camera 121b. The camera 121b faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121b may operate with a relatively higher pixels (higher resolution) such that it can be useful for a user to obtain higher quality pictures for later use. The cameras 121 and 121b may be installed in the terminal body to be rotatable or popped up.

A flash 123 and a mirror 124 may additionally be disposed adjacent to the camera 121b. The flash 123 operates in conjunction with the camera 121b when taking a picture using the camera 121b. The mirror 124 can cooperate with the camera 121b to allow a user to photograph himself in a self-portrait mode.

A power supply unit 190 for supplying power to the electronic device 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display module 210, the touchpad 135 may be implemented as a light-transmissive type. Here, if the display unit 151 is configured to output visual information from both surfaces, the visual information can be recognized through the touchpad 135. The information output from the both surfaces may all be controlled by the touchpad 135. Unlike to this, a display may further be mounted on the touchpad 135 so as to configure a touch screen even on the rear case 102.

Also, a mobile terminal in accordance with one exemplary embodiment, which may include at least one of the aforementioned components, may execute a function for allowing a user to input information while capturing a video.

Figure 3:
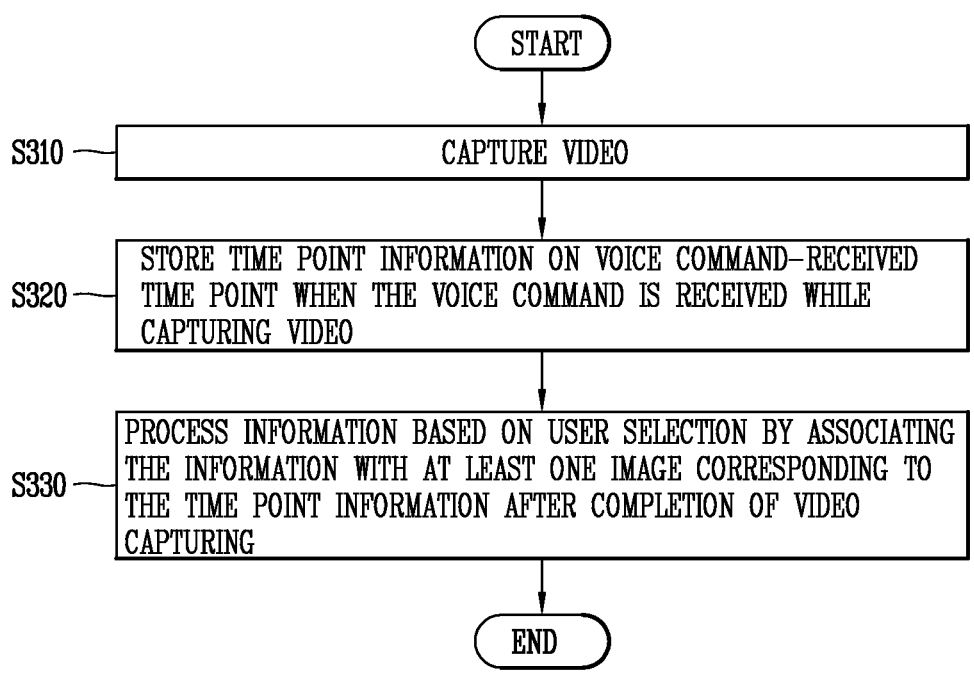
FIG. 3 is a flowchart illustrating a control method for inputting memo information in a video in a mobile terminal according to one exemplary embodiment.
Figure 4:
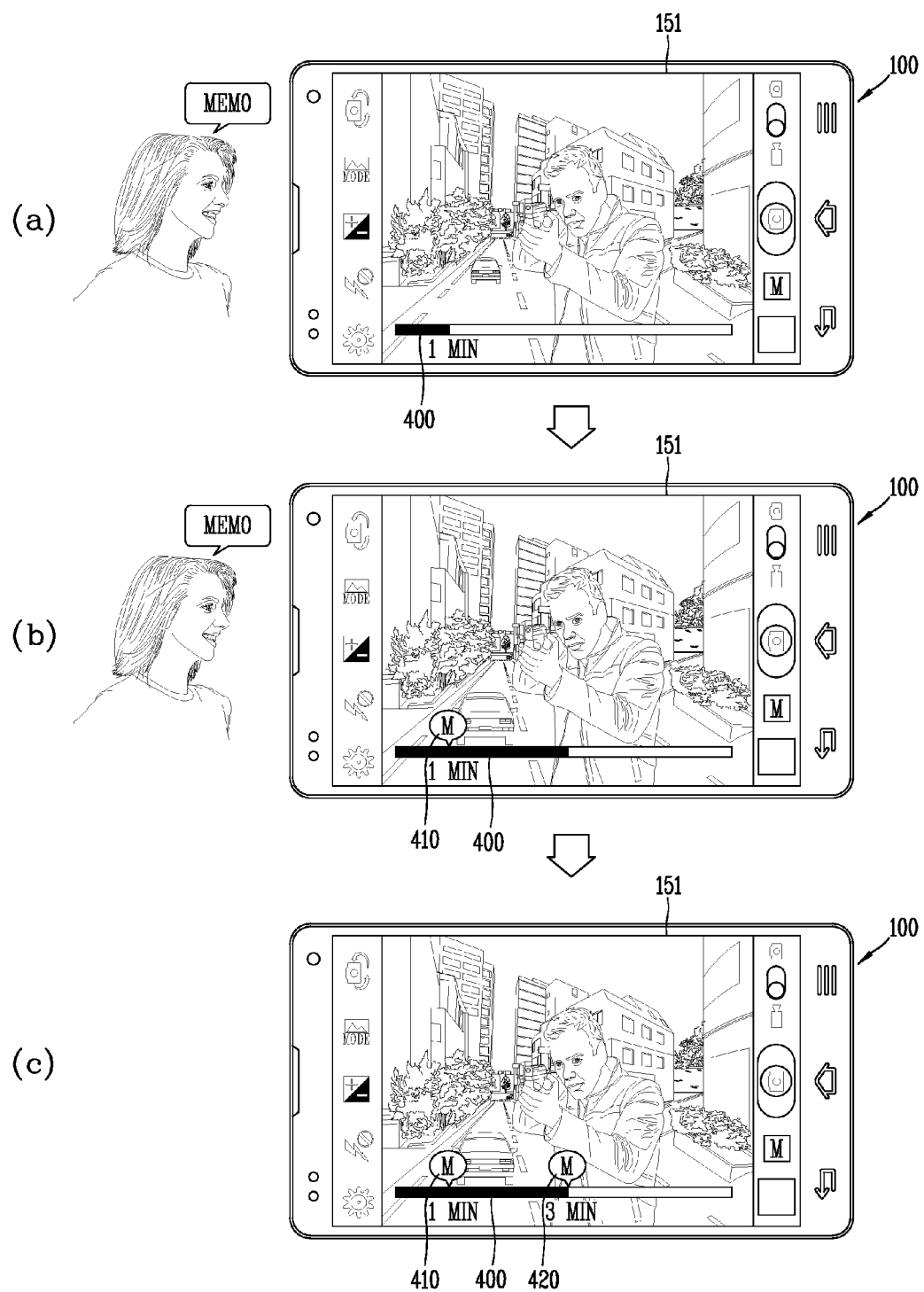
FIG. 4 is a conceptual view illustrating the control method of FIG. 3.

Hereinafter, a method of inputting memo information in a video in a mobile terminal in accordance with one exemplary embodiment. FIG. 3 is a flowchart illustrating a control method of inputting memo information in a video in a mobile terminal according to one exemplary embodiment, and FIG. 4 is a conceptual view of the control method illustrated in FIG. 3.

First, the mobile terminal according to the one exemplary embodiment may capture a video (S310).

The capturing of the video may be executed using the camera 121. Referring to FIGS. 2A and 2B, the camera 121 may include a front camera 121a and a rear camera 121b. The front camera 121a and the rear camera 121b may have different pixels from each other, and have image capturing directions, which are substantially opposite to each other.

For example, it may be preferable that the front camera 121a has a relatively small number of pixels enough not to cause difficulty when the user captures his or her own face and sends it to the other party during a video call or the like, and the rear camera 121b has a relatively large number of pixels since the user often captures a general object.

The present disclosure may usually use the rear camera 121b because of capturing an object, but may also be applied to the use of the front camera 121a. The present disclosure may also use both of the front camera 121a and the rear camera 121b. The exemplary embodiments disclosed herein are illustrated based on capturing of an object using the rear camera 121b, but may also be applied to the case of capturing an object using the front camera 121a or the case of capturing an object using both of the front camera 121a and the rear camera 121b.

The controller 180 may start to capture a video in response to reception of a user's control command for starting the capturing of the video. The control command may be at least one of a voice command, a button command, a touch command and a gesture command. The capturing of the video may be executed after activating an application preinstalled in the mobile terminal.

When the control command for the video capturing is received, the controller 180 may control the camera 121 to capture an image. The image may be an external environment image received through the camera 121. The image may include at least one object. The object may include at least one of objects to be captured, for example, a building, a tree, a thing, a person, and so on.

When the video capturing is executed by the camera 121, a video (a moving image or an image) received from the camera 121 may be output on the display unit 151. Here, the display unit 151 may output the video captured by the camera 121 in real time. To this end, the user may view the video, which the user is capturing in real time, through the display unit 151.

On the other hand, in addition to the image received from the camera 121, a progress bar which indicates a progress of capturing the video using the camera 121 may also be output on the display unit 151. The progress bar may be output to overlap the received video, and inform the user of a current time that the video is captured. The display unit 151 may be divided into a plurality of areas, such that the progress bar can be displayed on one area and the video captured by the camera 121 can be output on another area.

During the capturing of the video, the mobile terminal according to one exemplary embodiment may receive a control command for inputting memo information, and store time point information related to a time point that the control command has been received (S320).

In more detail, when the captured video is played back (reproduced), the controller 180 of the mobile terminal may allow the user to set a time point to output the video along with a memo. Here, the time point of outputting the video together with the memo may be set while the video is captured. Also, the time point of outputting the video together with the memo may be set even after capturing the video. Hereinafter, the time point of outputting the video along the memo while the video is captured will be described in more detail.

In the mobile terminal according to the present disclosure, the user may input into the mobile terminal a control command for selecting a time point for inputting memo information. That is, the controller 180 may receive from the user a control command related to the time point of outputting the memo information together with the video. The control command may be at least one of a voice command, a touch command, a gesture command and a button command. For example, the user may transmit a control command using a voice "Memo" to the mobile terminal.

The mobile terminal according to the one exemplary embodiment disclosed herein may further include a microphone 122 to receive a voice command. Upon reception of the user's voice, the microphone 122 may convert the received user's voice into an audio signal and process the audio signal into voice data. For example, when a control command using a user's voice "Memo" is generated, the microphone 122 may convert the voice into an audio signal. Afterwards, the microphone 122 may receive the audio signal, convert the audio signal into voice data and transmit the voice data to the controller 180.

On the other hand, the controller 180 may have to distinguish a capturing sound for the video over the user's voice control command. For this, the controller 180 may include two microphones 122 disposed on both end portions of the mobile terminal. For example, for capturing sound for the video, the controller 180 may determine it as a voice, which is entered with the same volume through the two microphones 122. For the user's voice control command, the controller 180 may determine it as a voice control command which is heard louder through one of the two microphones (e.g., 122).

Upon reception of the control command for inputting the memo information, the controller 180 may store time point information related to a time point that the control command has been received while the video is captured. For example, when the voice data is received through the microphone 122, the controller 180 may store time point information corresponding to the voice data.

The time point information may be information related to a time point for entering memo information after completion of the video capturing. The time point information may include at least one of a time point at which the control command has been received, and a specific section including the control command-received time point. Here, the specific section including the control command-received time point may indicate a specific reproduction section which includes the time point at which the control command has been received. For example, the specific section may be a section including a predetermined time before and after the control command-received time point. In more detail, when the control command-received time point is one minute after the video has been captured, the specific section may be a section including 10 seconds before the one minute and 10 seconds after the one minute, namely, a section ranging from 50 seconds to 1 minute and 10 seconds.

Meanwhile, when the time point information is stored, the controller 180 may output a graphic object which corresponds to the time point information on the display unit 151. The graphic object may be output on an area adjacent to the progress bar. For example, the graphic object may be output on a progressing time position of the progress bar, corresponding to the time point information which matches the graphic object. For example, when the time point information is time point information indicating 10 seconds, the graphic object may be output on a position corresponding to the 10-second point (position) of the progress bar.

Afterwards, the mobile terminal according to one exemplary embodiment may process the set memo information after the video capturing is completed, in such a manner of associating the memo information with at least one video frame corresponding to the time point information related to the control command-received time point (S330).

After storing the time point information, the controller 180 may receive memo information input (entered or written) by the user when the capturing of the video is completed. The memo information input by the user may be at least one video frame, voice and text.

The user may also input the memo information using at least one of a touch input applied onto the display unit 151 and a separate input device. For example, the user may input the memo information using a keyboard image having a plurality of keys output on the display unit 151.

After receiving the user-input memo information, when the captured video is reproduced (played back), the controller 180 may output the at least one image, which corresponds to the time point information related to the control command-received time point while the video is captured, along with the memo information.

Here, the controller 180 may output memo information along with the at least one video frame, corresponding to the time point information, of the reproduced video, at a time point at which the at least one video frame is reproduced. When the memo information is output along with the at least one image, there may be various methods for outputting the memo information.

For example, the memo information may be output by being overlapped on the at least one video frame while the video is reproduced. Also, the memo information may be separately output on an area for outputting the memo information, which is different from an area on which the video is reproduced, of areas of the display unit 151.

On the other hand, the controller 180 may keep outputting the memo information for a predetermined time while the video is reproduced. That is, the memo information may be continuously output for a predetermined reproduction section of the video. The predetermined reproduction section may include the control command-received time point. For example, when the control command-received time point is 1 minute, the predetermined reproduction section may be a section ranging from 50 seconds to 1 minute and 10 seconds. That is, the controller 180 may output the memo on the display unit 151 for the predetermined reproduction section ranging from 50 seconds to 1 minute and 10 seconds.

Here, a length of the predetermined reproduction section may be decided by a user selection or may correspond to a preset value. For example, the length of the predetermined reproduction section may be selected directly by the user. When the length of the predetermined reproduction section is set by the user, the controller 180 may set the predetermined reproduction section to include the control command-received time point. For example, when the user sets the length of the predetermined reproduction section to 10 seconds and the control command-received time point is 1 minute, the predetermined reproduction section may be in the range from 55 seconds to 1 minute and 5 seconds.

Referring to FIG. 4, while the video is captured, the mobile terminal may output an image received from the camera 121 and a progress bar 400 which indicates a progressing degree of capturing the video on the display unit 151.

The controller 180 may receive a control command for input of memo information while the video is being captured. For example, referring to (a) of FIG. 4, the control command may be a user's voice command.

When the user's control command is received while the video is captured, the controller 180 may store time point information corresponding to the control command-received time point. For example, referring to (b) of FIG. 4, when the user's voice command is received, the controller 180 may store time point information corresponding to the voice command-received time point. That is, when the voice command is received approximately at a 1-minute (point or position) while the video is captured, the controller 180 may store time point information corresponding to the approximately 1-minute point.

When the time point information related to the approximately 1-minute point is stored, referring to (b) of FIG. 4, the controller 180 may output a graphic object 410 indicating that the time point information has been stored.

The graphic object 410 may match the time point information. Also, an appearance of the graphic object 410 may change according to a type of memo. For example, the graphic object 410 may be represented as 'V' for a voice memo, 'M' for a text memo, and 'I' for an image memo.

The graphic object 410 may also be output on an area adjacent to an area where the progress bar 400 is output. For example, the graphic object 410 may be output on a position corresponding to a time of the progress bar 400, which corresponds to a time point matched with the graphic object 410. For example, referring to (b) of FIG. 4, the graphic object 410 may be output on a position corresponding to one minute of the progress bar 400 because the graphic object 410 is matching the 1-minute point.

Still referring to (b) of FIG. 4, the controller 180 may receive a plurality of control commands from the user while the video is captured. For example, the controller 180 may receive a voice command two times from the user while the video is captured.

Referring to (c) of FIG. 4, the controller 180 may store time point information corresponding to a time point at which the second control command has been received. For example, the second control command may be received approximately at a 3-minute point while the video is captured. Here, the controller 180 may store time point information corresponding to the 3-minute point. Also, the controller 180 may output a graphic object 420, which indicates that the time point information has been stored approximately at the 3-minute point, on the display unit 151.

Meanwhile, a time point at which memo information is to be input may be as soon as the video being captured or be set to a time point corresponding to an already captured image while the video is captured. For example, even when 3 minutes have elapsed after the video capturing is started, the user may set the time point for inputting the memo information to a 1-minute point. Here, the user may apply a control command for storing a time point for inputting the memo at the approximately 1-minute point. For example, the control command for storing the time point for inputting the memo at the approximately 1-minute point may be applied by a touch input onto the progress bar, As described above, description has been given of the method of setting the time point for inputting the memo information while the video is captured, inputting the memo after the video capturing is completed, and processing the memo in association with the captured video. This may allow the user to input the memo information during capturing of the video as well as during reproduction of the video.

Figure 5:
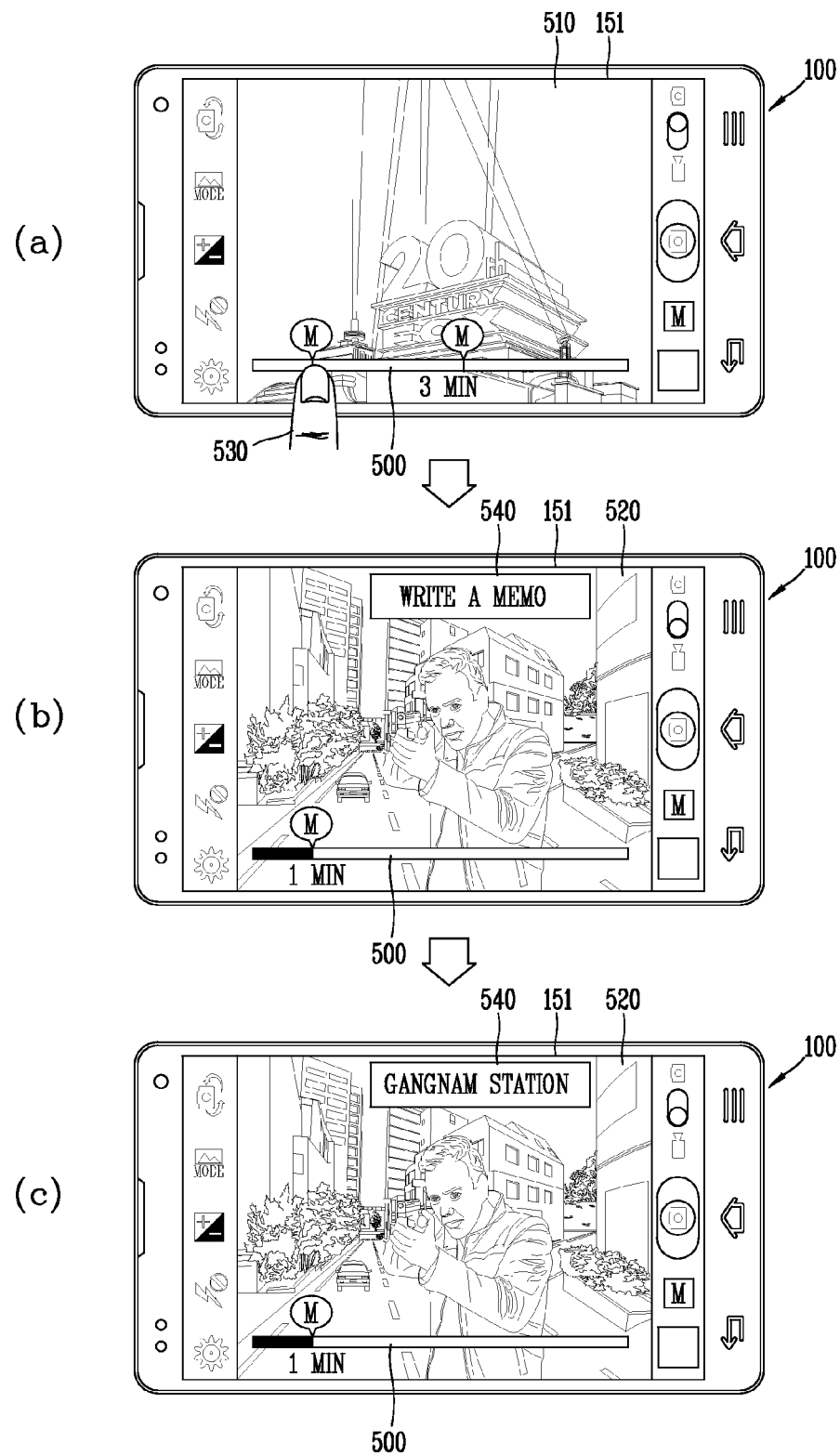
FIG. 5 is a conceptual view illustrating a method of inputting memo information after completing video capturing in the mobile terminal.

Hereinafter, description will be given of a method of inputting memo information onto at least one image corresponding to time point information, which is stored during capturing of a video. FIG. 5 is a conceptual view illustrating a method of inputting memo information after completion of the video capturing in the mobile terminal in accordance with the one exemplary embodiment.

The user may store time point information, which corresponds to a time point for inputting memo information in a reproduction section of the video, through a control command for inputting the memo information while the video is captured.

Afterwards, when the capturing of the video is completed, a progress bar indicating a reproduction progress of the video and at least one graphic object, which matches the stored time point information, may be output on one area of the display unit 151.

After the completion of the capturing of the video, the user may select one of the at least one graphic object which matches the time point information, in order to input memo information. For example, referring to (a) of FIG. 5, at least one graphic object may be output on a progress bar 500. Here, the user may select a graphic object corresponding to a 1-minute point of the progress bar 500 based on a touch input 530.

When the graphic object is selected, the controller 180 may move a video reproduction time point to a time point matched with the graphic object. Here, a video frame corresponding to the graphic object-matched time point may be output on the display unit 151. For example, referring to (b) of FIG. 5, a video frame corresponding to a time point selected by the user may be output on the display unit 151.

When the user-selected time point is a 1-minute point, a video frame corresponding to the 1-minute point may be output.

Here, when a video frame 520 corresponding to the graphic object-matched time point is output, the user may input memo information in one area 540 of the display unit 151. Here, the user may input the memo information using at least one of a touch input, a button input and a voice input. For example, when the memo information is input by the touch input, the controller 180 may output a keyboard image having a plurality of keys on the display unit 151. Hence, the user may input the memo information through the touch input with respect to the keyboard image. As another example, the memo information may be input by the voice input. Here, the controller 180 which has received the voice input may convert the voice input into text using a speech to text (STT) function and output the text on the display unit 151.

Referring to (c) of FIG. 5, when the user inputs a memo "Gangnam station," memo information 540 "Gangnam station" may be output on one area of the display unit 151 together with the image 520.

The foregoing description is that a memo is input after completion of the capturing of a video using time point information which has been stored during capturing of the video. The user may preset memo information to be output on a user-selected video frame during capturing of the video and then input the memo information on the video frame after the completion of the capturing of the video.

Hereinafter, description will be given of a method of outputting the memo information during reproduction of the video when the memo information has been input. FIG. 6 is a conceptual view illustrating that memo information is output during reproduction of a video in the mobile terminal in accordance with the one exemplary embodiment.

During capturing of a video, the user may store time point information related to a time point corresponding to a user-selected video frame, in order to input memo information into the video frame. After completion of the video capturing, the user may process the user-input memo information based on the time point information, in a manner of associating the memo information with at least one image corresponding to the time point information.

That is, when the captured video is reproduced, the controller 180 may output on the display unit 151 memo information, which has been set by the user after completion of the video capturing, together with at least one video frame corresponding to the time point information.

For example, referring to FIG. 6, the controller 180 may reproduce the captured video. Referring to (a) of FIG. 6, a first image 510 of the captured video may be output on the display unit 151. Here, referring to (b) of FIG. 6, when a reproduction time point in which the memo information has been stored comes while the video is reproduced, an image 520 corresponding to the reproduction time point may be output together with the memo information.

Meanwhile, the controller 180 may keep outputting the memo information, which has been set after the completion of the capturing of the video for a predetermined reproduction section, which includes the time point corresponding to the memo information-input image. For example, when the time point corresponding to the memo information-input image is a 1-minute point, the memo information may be continuously output for a time between 55 seconds and 1 minute and 5 seconds.

A length of the predetermined reproduction section may be decided by a user selection or may correspond to a preset value. For example, the user may select the length of the predetermined reproduction section as 10 seconds.

The foregoing example has illustrated that memo information is output in response to reproduction of a video when the memo information has been input after capturing the video, based on time point information which has been stored during the capturing of the video. The user may also view the memo information input by himself/herself upon the reproduction of the video.

Figure 7:
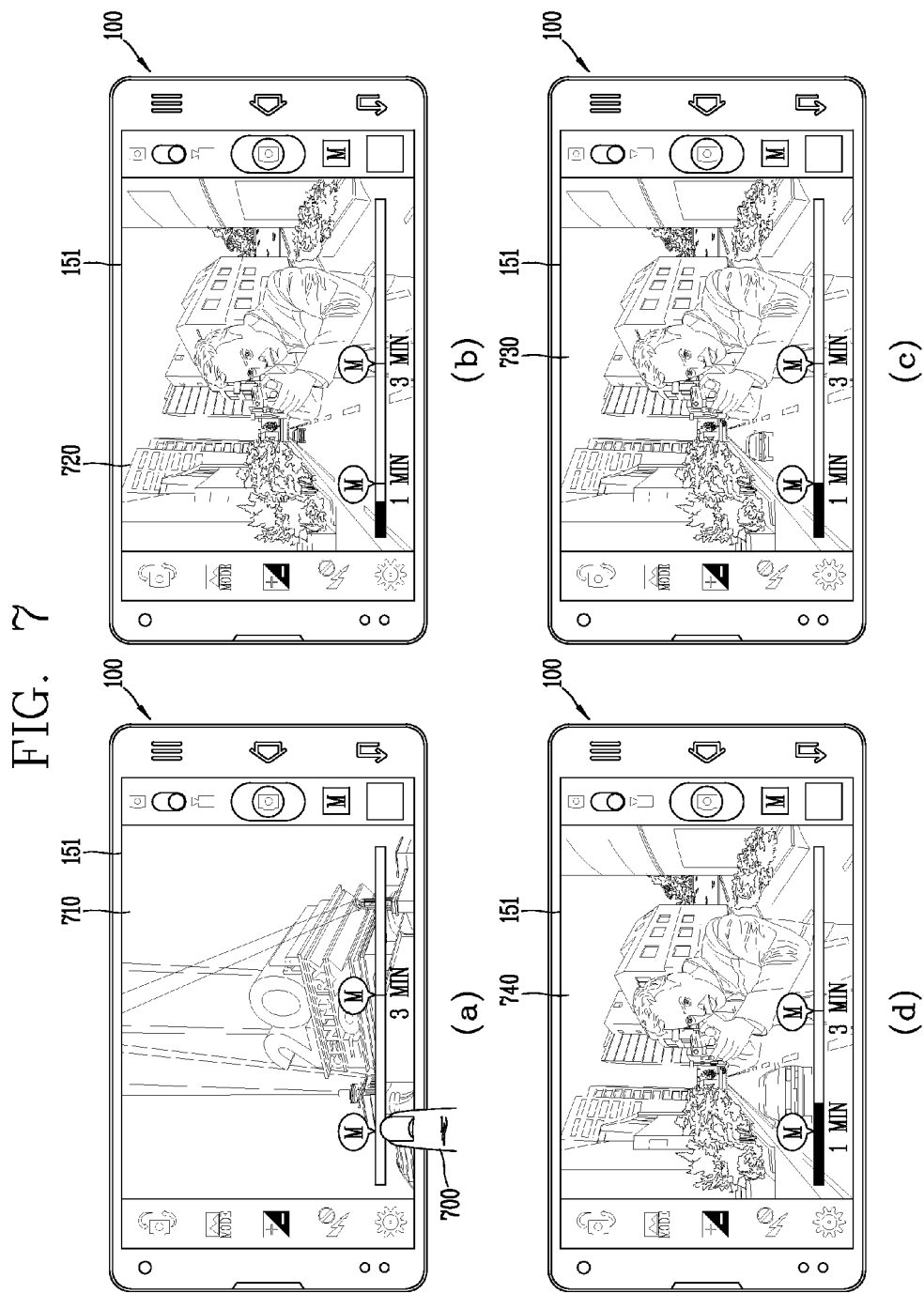
FIG. 7 is a conceptual view illustrating that a specific reproduction section of the video is played back (reproduced) when an input time point of the memo information is selected in the mobile terminal.

Hereinafter, description will be given of a control method for a mobile terminal when a graphic object corresponding to time point information stored during capturing of a video is selected. FIG. 7 is a conceptual view illustrating that a specific reproduction section of a video is reproduced when memo information input time point is selected in the mobile terminal in accordance with the one exemplary embodiment.

The controller 180 may receive a user's control command for selecting one of at least one graphic object, which corresponds to time point information stored during the capturing of the video, after completion of the capturing of the video.

When the one graphic object is selected, the controller 180 may reproduce a specific reproduction section of the video, which includes a time point corresponding to the selected graphic object. For example, referring to (a) of FIG. 7, the user may select (700) one of at least one graphic object output on the display unit 151. For example, the user may select a graphic object which matches a 1-minute point.

In response to the selection of the graphic object, the controller 180 may reproduce the specific reproduction section of the video including the time point which matches the graphic object, based on the time point information matched with the graphic object.

A length of the predetermined reproduction section may be set by a user or preset. For example, the controller 180 may set the length of the specific reproduction section to 10 seconds. Here, when the user selects a graphic object which matches a 1-minute point, the controller 180 may set the specific reproduction section as a time section ranging from 55 seconds and 1 minute and 5 seconds, based on the 1-minute point. That is, referring to (b), (c) and (d) of FIG. 7, the controller 180 may reproduce the video corresponding to the time section between 55 seconds and 1 minute and 5 seconds.

The user may input memo information onto an exact video frame that the user desires in such a manner of reproducing the video of the specific reproduction section.

The foregoing example has illustrated that the reproduction section of the video near the time point is reproduced when the graphic object matched with the time point is selected after completion of the capturing of the video. The user may check a video frame near the memo input time point.

Figure 8:
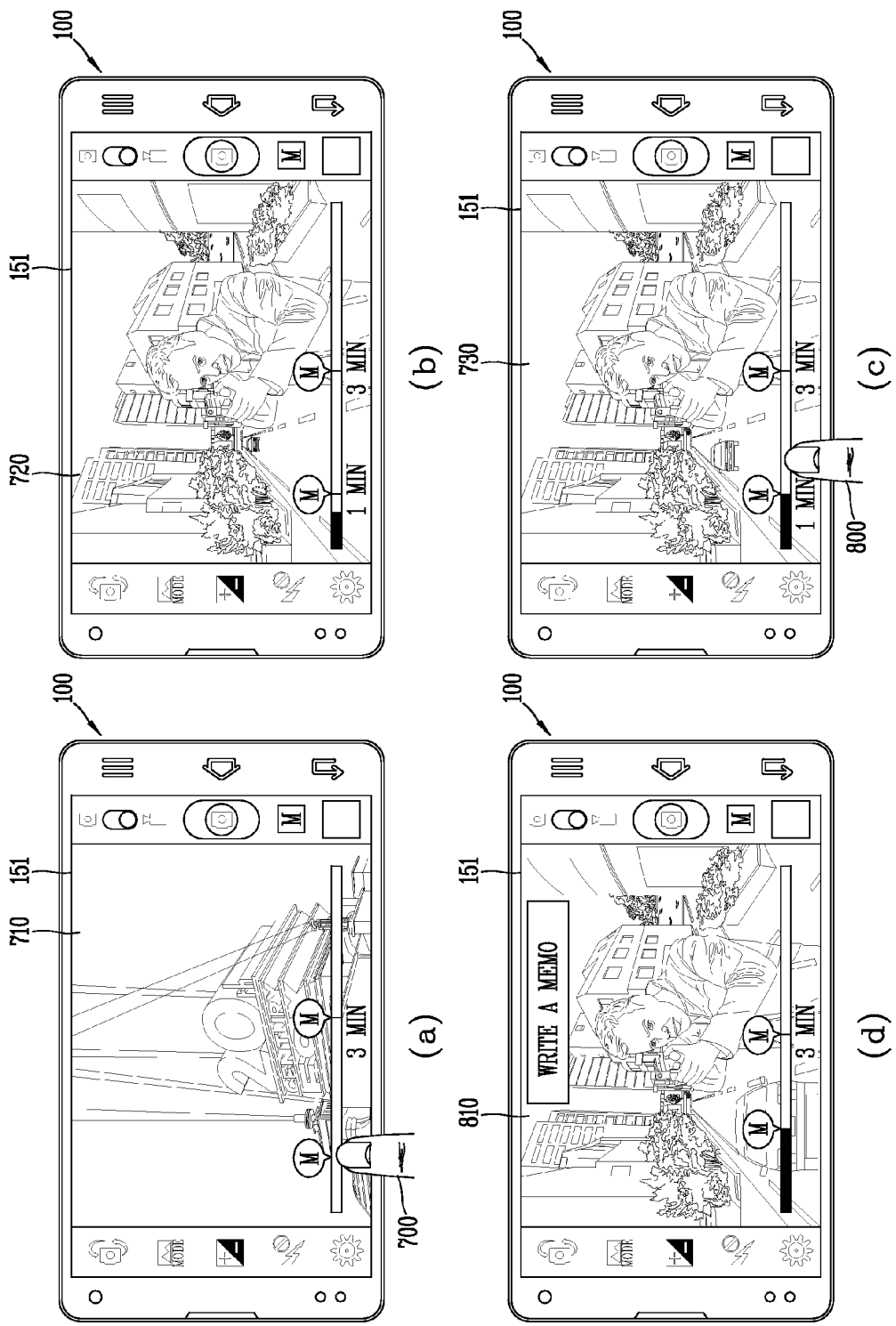
FIG. 8 is a conceptual view illustrating that one time point of a specific reproduction section is set by a user as an output time point of the memo information when the specific reproduction section of the video is played back in the mobile terminal.

Hereinafter, description will be given of a method of setting a video frame, on which a memo is to be output, by way of a user's touch manipulation while a specific reproduction section of a video is reproduced. FIG. 8 is a conceptual view illustrating that a memo information input time point is set by a user to one time point within a specific reproduction section when the specific reproduction section of the video is reproduced in the mobile terminal.

The user may change a time point, which has been selected during capturing of a video for outputting memo information, after completion of the capturing of the video.

There may be various methods of changing the time point. As one example, the method of changing the time point may be achieved by a touch manipulation.

For example, for changing the time point, a graphic object corresponding to time point information which has been stored during capturing of the video may be selected. In response to the selection of the graphic object, referring to FIG. 7, the controller 180 may reproduce the specific reproduction section of the video including the time point which matches the graphic object.

While the specific reproduction section of the video is reproduced, the user may select a video frame on which a memo is to be output. Here, the user may touch (800) a progress bar indicating a progress of the video. In response to the user's touch manipulation (800), the video frame on which the memo is to be output may be selected. For example, referring to (c) of FIG. 8, when the user applies a touch input onto an area (point) corresponding to 1 minute and 10 seconds of the progress bar, the controller 180 may set the area for outputting the memo information to a video frame corresponding to the time point of 1 minute and 10 seconds.

When the user's touch manipulation (800) is applied, the controller 180 may output a video frame 810 corresponding to a position to which the user's touch manipulation (800) is applied. For example, when the user's touch manipulation (800) is applied to an area corresponding to 1 minute and 10 seconds of the progress bar, the controller 180 may output a video frame corresponding to the area of 1 minute and 10 seconds on the display unit 151.

Here, a memo input window for inputting a memo may be output on the display unit 151. For example, referring to (d) of FIG. 8, when a video frame 810 for inputting a memo thereon is set based on the user's touch, the memo input window for inputting the memo may be output by being overlapped on the video frame 810.

The foregoing example has illustrated that the user selects the video frame for inputting the memo thereon based on the time point information stored during capturing of the video. This may allow the user to input a memo on an exact video frame that the user wants to leave the memo.

Hereinafter, description will be given of a method of changing an image, on which a memo is to be input, in response to a user's touch input with respect to a graphic object. FIG. 9 is a conceptual view illustrating that a memo information output time point changes in the mobile terminal in accordance with the one exemplary embodiment.

The user may change a time point, which has been selected to output memo information during capturing of a video, after completion of the capturing of the video.

As one example, the controller 180 may change a control command-received time point based on movement of a graphic object corresponding to the time point.

The movement of the graphic object may be executed by the user's touch input. For example, when a user's drag input is applied to the graphic object, the graphic object may be moved.

Here, the controller 180 may output a memo on a video frame corresponding to a time point of the progress bar, which corresponds to the moved position of the graphic object. That is, a video frame on which the memo information is to be output may be decided according to a position of the progress bar where the graphic object is output.

Referring to (b) of FIG. 9, a graphic object which matches a 1-minute point of the progress bar may be moved in response to a user's touch input. When the graphic object that matches the 1-minute point is moved, the controller 180 may output the memo information together with a video frame of the time point corresponding to the moved position.

For example, the user may move the graphic object, which matches the 1-minute point of the progress bar, to a right area of the progress bar through a drag input. Here, the controller 180 may set a video frame corresponding to a time point (for example, 1 minute and 10 seconds), which corresponds to an area where the graphic object is located, to a video frame for outputting the memo information thereon.

The foregoing example has illustrated the change in the time point for outputting the memo information in response to the user's touch with respect to the graphic object. The user may determine a time point for outputting memo information and an output or non-output of the memo in such a manner of touching the graphic object.

Hereinafter, description will be given of a method of determining a position, at which a memo is to be output, on a video frame which is output together with memo information. FIG. 10 is a conceptual view illustrating that a position for outputting memo information thereon is set in the mobile terminal in accordance with the one exemplary embodiment.

A user may input memo information after completion of the capturing of the video. Here, a position for outputting the input memo information may be decided by a user selection or the memo information may be output on a preset position.

As one example, the position for outputting the memo information may be decided by the user selection. To this end, a graphic object for setting the position for outputting the memo information may be output on the display unit 151. Here, the controller 180 may output the memo information on a position on which the graphic object is output.

The user may move the graphic object so as to set an area for outputting the memo information thereon. Here, the movement of the graphic object may be executed by a user's touch input. For example, the graphic object may be moved in response to a user's drag input with respect to the graphic object.

Referring to (a) of FIG. 10, the user may move the graphic object. Here, the movement of the graphic object may be achieved by a user's touch input 1010. For example, the user's touch input 1010 may be a drag input. Here, the graphic object may be moved onto one area of a video frame, which is being output on the display unit 151, in response to the drag input.

Referring to (b) of FIG. 10, when the graphic object is moved, an area 1020 for outputting the memo thereon may be set. Here, the area 1020 for outputting the memo may be an area corresponding to the area to which the graphic object has been moved.

The foregoing example has illustrated the method of setting the position for outputting the memo. This may allow the user to output the memo on various positions on an image.

Figure 11:
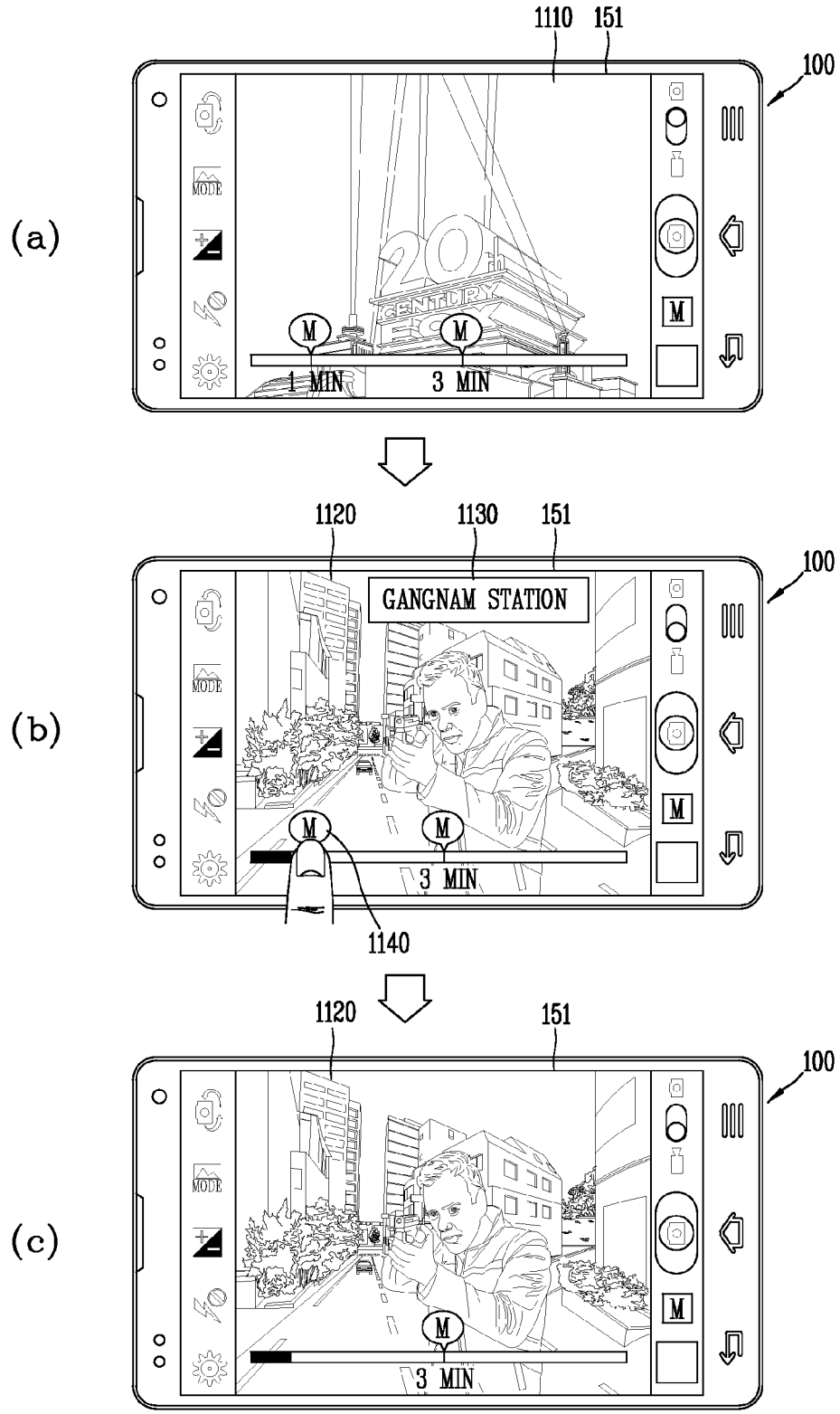
FIG. 11 is a conceptual view of deleting the memo information in the mobile terminal.

Hereinafter, description will be given of determining whether or not to output the set memo information. FIG. 11 is a conceptual view illustrating determination as to whether or not to output the set memo information.

Whether or not to output the set memo information may be determined based on a user's touch with respect to the graphic object. The controller 180 may output the set memo information together with at least one image, or may not output the memo information.

Here, in order not to output the memo information, the user may delete the memo information itself or delete a time point at which the memo information has been input. Here, when the time point at which the memo information has been input is deleted, the memo information which is output at the memo information-input time point may no longer be output on the display unit 151.

For example, the user may make the graphic object disappear from the display unit 151 so as not to output the memo information. The user may delete the graphic object in such a manner of touching the graphic object. The user's touch manipulation may be a long touch 1140. For example, referring to (b) of FIG. 11, the graphic object may disappear when the long touch 1140 is applied.

When the graphic object is deleted, the controller 180 may no longer output the memo information which is output on the video frame corresponding to the graphic object-matched time point. For example, referring to (c) of FIG. 11, when the graphic object which matches a 1-minute point is deleted, the controller 180 may no longer output the memo information which is output on an image corresponding to the 1-minute point.

The controller 180 may control the display unit 151 not to output the memo information together with a reproduced image when the video is reproduced, in response to the manipulation which is applied not to output the memo information.

The foregoing example has illustrated the determination as to whether or not to output the set memo information. The user may determine whether or not to output the memo information in such a manner of touching the graphic object which matches the time point information.

The present disclosure may provide a method of setting a time point for inputting memo information during capturing of a video and inputting memo information at the set time point after completing the capturing of the video. This may allow a user to input a memo on a scene that the user wants to leave the memo after the completion of the video capturing.

Also, while capturing the video, a time point at which the memo information is to be input may be selected and also the memo information may be directly input, which may result in simultaneous execution of the capturing of the video and inputting the memo information.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

What is claimed is:

1. A mobile terminal configured to capture a video, the mobile device comprising:
   a camera configured to capture the video;
   a display configured to display information; and
   a controller configured to:
   cause the display to display the video being captured and a progress bar indicating a progress of the video being captured;
   store a first time point of the video being captured and cause the display to display a graphic object indicating the first time point adjacent to the progress bar when a control command is received while the video is being captured, wherein the control command is for reserving the first time point as a position for receiving memo information and the control command is at least one of a voice command, a button command, a touch command or a gesture command, cause the display to display a video frame of the video corresponding to the first time point in response to a touch input received via the graphic object; and associate the memo information with the video frame of the captured video and cause the display to display the video frame comprising the memo information in response to a receipt of the memo information.

2. The terminal of claim 1, wherein the controller is further configured to cause the display to:

reproduce the captured video after associating the memo information with the video frame; and display the associated memo information when the video frame is displayed during reproduction of the captured video.

3. The terminal of claim 2, wherein the controller is further configured to cause the display to display the memo information for a predetermined time period, wherein the predetermined time period includes the first time point.

4. The terminal of claim 3, wherein a length of the predetermined time period is set by a user selection or is set to a preset value.

5. The terminal of claim 2, wherein the controller is further configured to:

change the stored first time point to correspond to a second time point of the captured video according to a user input selecting the second time point;

set the memo information to be associated with at least one video frame of the captured video at the second time point; and cause the display to display the memo information when the at least one video frame of the captured video at the second time point is displayed during reproduction of the captured video.

6. The terminal of claim 5, wherein the controller is further configured to cause the display to display:

the progress bar further indicating a reproduction progress of the video while the video is being reproduced; and at least one graphic object corresponding to the second time point on an area of the display adjacent to the progress bar, wherein the user input selecting the second time point comprises an input moving the graphic object from a first position on the progress bar corresponding to the first time point to a second position on the progress bar corresponding to the second time point.

7. The terminal of claim 1, wherein the controller is further configured to cause the display to display:

a video frame of the video corresponding to a second time point of the video being reproduced after the capturing of the video is completed; and the graphic object while the video is reproduced, wherein the touch input is received via the graphic object while the video frame of the video corresponding to the second time point is displayed.

8. The terminal of claim 7, wherein the controller is further configured to cause the video reproduced via the display to move from the video frame corresponding to the second time point to the video frame corresponding to the first time point in response to the touch input.

9. The terminal of claim 1, wherein the controller is further configured to determine whether the memo information is displayed during reproduction of the video frame of the captured video based on a display status of the graphic object.

10. The terminal of claim 9, wherein the controller is further configured to:

remove the graphic object in response to a prolonged touch input by a user;

determine that the memo information is not to be displayed during reproduction of the video frame if the graphic object has been removed; and cause the display to reproduce the captured video without displaying the memo information.

11. The terminal of claim 1, wherein the controller is further configured to determine at least one appearance attribute of the graphic object based on at least a position of the first time point or a data type of the memo information.

12. The terminal of claim 1, wherein the controller is further configured to set the memo information to be associated with at least one more video frame adjacent to the video frame and cause the display to display the at least one more video frame comprising the memo information in response to the receipt of the memo information.

13. The terminal of claim 1, wherein the memo information comprises at least one of image data, text data, or voice data.

14. The terminal of claim 1, wherein the controller is further configured to cause the display to display:

the graphic object at a first position of the display; and the memo information at the first position when the video frame of the captured video is reproduced.

15. The terminal of claim 14, wherein the first position is determined in response to a touch input by a user.

16. A control method for a mobile terminal, the method comprising:

capturing a video via a camera of the mobile terminal;

displaying on a display of the mobile terminal a video being captured and a progress bar indicating a progress of the video being captured;

storing a first time point of the video being captured in a memory of the mobile terminal and displaying on the display a graphic object indicating the first time point adjacent to the progress bar when a control command is received while the video is being captured, wherein the control command is for reserving the first time point as a position for receiving memo information and the control command is at least one of a voice command, a button command, a touch command or a gesture command;

displaying on the display a video frame of the video corresponding to the first time point in response to a touch input received via the graphic object; and associating the memo information with the video frame of the captured video and displaying on the display the video frame comprising the memo information in response to a receipt of the memo information.

17. The method of claim 16, further comprising:

reproducing the captured video after associating the memo information with the video frame and displaying the associated memo information when the video frame is displayed during reproduction of the captured video.

18. The method of claim 17, further comprising displaying the memo information for a predetermined time period while the captured video is being reproduced, wherein the predetermined time period includes the first time point.

19. The method of claim 17, further comprising displaying:

a video frame of the video corresponding to a second time point of the video being reproduced after the capturing of the video is completed; and the graphic object while the video is reproduced, wherein the touch input is received via the graphic object while the video frame of the video corresponding to the second time point is displayed.

20. The method of claim 16, further comprising:

changing the stored first time point to correspond to a second time point of the captured video according to a user input selecting the second time point;

setting the memo information to be associated with at least one video frame of the captured video at the second time point; and displaying the memo information when the at least one video frame of the captured video at the second time point is displayed during reproduction of the captured video.

21. The method of claim 20, further comprising:

displaying the progress bar further indicating a reproduction progress of the captured video while the captured video is being reproduced; and displaying at least one graphic object corresponding to the second time point on an area of the display adjacent to the progress bar, wherein the user input selecting the second time point comprises an input moving the graphic object from a first position on the progress bar corresponding to the first time point to a second position on the progress bar corresponding to the second time point.

* * * * *